3,183,238
ORGANOTIN MERCAPTO COMPOUNDS
Edouard Barbanson, Ribecourt (Oise), France, assignor to Carlisle Chemical Works, Inc., Reading, Ohio
No Drawing. Filed Jan. 2, 1963, Ser. No. 248,879
Claims priority, application France, Jan. 3, 1962, 883,753
3 Claims. (Cl. 260—299)

This invention relates to novel organotin mercapto compounds and to resins stabilized therewith.

The new compounds have a good solubility in conventional organic solvents such as alcohols and methylethyl ketone. They are compatible with vinyl chloride containing resins; they impart thereto good lubrication and do not sweat out like some other organotin compounds used as stabilizers.

The compounds of the invention correspond to the general formula

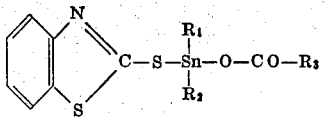

In said formula, $R_1$ and $R_2$ represent the same or different aromatic, aliphatic or alicyclic radicals, and $R_3$ represents an aromatic or fatty acid radical. Compounds of similar composition but without the CO group are obtained when $R_3$ is a radical containing a hydroxyl group such as a phenol, alkyl phenol, or a polyol, or the radical of an amine or aminophenol, or the radical of an acid having several alcoholic groups.

If $R_3$ is a fatty acid radical, it must contain a sufficiently large number of carbon atoms to produce satisfactory lubrication, whereas, on the other hand, the number of carbon atoms must not be so high as to affect the compatibility of the compounds with vinyl chloride resins and to produce sweating-out. I prefer to use fatty acids of the $C_8$ to $C_{18}$ group, such as 2-ethylhexoic acid, caprylic acid, lauric acid, and stearic acid.

$R_3$ may also be the radical of an organic compound containing an acidic hydrogen, for instance, a phenolic derivative.

Substituents at the benzo thiazole ring may be those enumerated, for instance, under $R_A$ and $R_B$ in column 2 of Patent No. 2,731,441, which for $R_1$ and $R_2$ recommends hydrocarbon radicals with a range up to 22 carbon atoms.

The new compounds are obtained by reacting 1 mole of an organotin oxide with one mole of a mercaptobenzothiazole derivative and one mole of a compound $R_3COOH$ or any of the compounds listed above. As mixed organotin salts of 2-mercapto benzothiazoles and monocarboxylic acids, or phenols or the like, the new compounds have unusual properties not presented by a mixture of such salts. They stabilize up to higher temperatures and for longer heating times than the corresponding organotin salts of monocarboxylic acids in which both valences of the organotin radical are bound to the acid radical, and present less the smell of the dibenzothiazylmercapto compounds.

The following examples illustrate the preparation of the new compounds and their use as stabilizers.

*Example 1*

1 mole of 2-mercaptobenzothiazole, 1 mole of 2-ethylhexoic acid, and 2 moles of 2-ethylhexanol were heated with stirring at 120° C. until a homogeneous solution was obtained. Then one mole of dibutyltin oxide was introduced and the mixture was refluxed, with vigorous stirring, whereby a practically instantaneous reaction took place. The water of reaction was distilled off under slightly reduced pressure, entraining some 2-ethylhexanol. The hot solution was diluted with 2-ethyl hexanol to adjust it to the desired tin content and was filtered. The obtained filtered solution can be used as such for the stabilization of polyvinyl chloride.

Instead of 2-ethylhexoic acid, any other saturated fatty acid of the $C_8$–$C_{18}$ group may be used.

If the end product shall be obtained in solid powdery form, the reaction is carried out in methylethyl ketone instead of 2-ethylhexanol or similar alcohols. After termination of the reaction, water is added which precipitates the mixed salt as crystals.

*Example 2*

1 mole of octylphenol, 1 mole of mercapto benzothiazole, and 1.5 moles of 2-ethyl hexanol were heated at 130° C. with stirring until a homogeneous phase had been obtained. Then one mole of dibutyltin oxide was added. In this case, the reaction was slower than in Example 1, and the mixture had to be refluxed for about 10 minutes at said temperature for completion of the reaction.

The water of reaction was removed, and the tin concentration was adjusted to the desired value by addition of 2-ethylhexanol. After filtration, the reaction product was a red liquid which was obtained in a yield of 95%. The product may be obtained in the crystallized state by carrying out the reaction in methylethyl ketone as set forth in Example 1.

Instead of octylphenol, other phenols or alkyl phenols may be used.

A chromatographic analysis shows that actually the mercaptobenzothiazole-octylphenol derivative and not a mixture of dibutyltin dimercaptide and dibutyltin dioctylphenolate was obtained. The paper used for the analysis was Whatman filter paper No. 1.

The stationary phase was constituted by a mixture of 20% propylene glycol and 80% methanol. The chromatogramme was developed by means of

|  | Parts |
|---|---|
| Essence F [1] | 10 |
| Methanol | 8 |
| Water | 2 |

[1] "Essence F" is a mineral oil fraction meeting the following norms of the Syndicat Francais des Essences Speciales: Specific gravity: 0.74–0.75 at 15° C.; distills completely between 100° and 160° C.; Abel flash point below 20° C.; aniline point 55.5° C.; kauri-butanol index 36; content of aromatic hydrocarbons below 15%; Saybolt color plus 30; vapor pressure 70 mm. Hg at 37° C.

Ultraviolet analysis showed the presence of the thiazole derivative.

Solubility tests show also that the obtained compounds are the dibutyltin monomercapto monosalts and not mixtures of the dibutyltin dicompounds because the latter are soluble in tetraethylene pentamine while the compounds of the invention are not.

The compositions of this invention are characterized by a resistance to heat which is superior to that of conventional organotin stabilizers, and they are easily obtained in a very pure state.

For comparative stabilization tests, the following mixture was used.

|  | Parts |
|---|---|
| Vinyl chloride resin of medium molecular weight | 100 |
| Di-(2-ethylhexyl) phthalate | 50 |
| Stabilizer, calculated on tin content | 1.3 |

The ingredients were blended and milled for 5 minutes at 165° C. on a roll mill, and specimens of the thus obtained sheet were placed in a forced draft oven maintained at 185° C. The results were as follows.

Dibutyltin compound used: Start of decomposition after minutes

- Dialcoholate _____ 50
- Dimaleate _____ 60
- Mono(2-benzothiazyl)monooctoate _____ 130
- Mono(2-benzothiazyl)monocaprylate _____ 120
- Mono(2-benzothiazyl)monolaurate _____ 100
- Mono(2-benzothiazyl)monostearate _____ 100
- Methene 4,4'dihydroxybiphenyl _____ 80

In connection with vinyl chloride resins, the new compounds may be used in amounts of 0.5 to 10 preferably 0.5 to 2.5 percent by weight of the resin. The following table shows the results obtained with varying amounts of dibutyltin mono(2-benzothiazyl) mercaptide monooctoate.

Percent stabilizer: Start of decomposition after minutes

- 2.5 _____ 140
- 2.0 _____ 130
- 1.5 _____ 130
- 1.0 _____ 80
- 0.5 _____ 40

The compounds of the present invention are not only useful as stabilizers for resinous vinyl chloride polymers and copolymers but also as vulcanization accelerators for natural and synthetic rubbers and as polymerization accelerators for polyesters. The new compounds may be used alone or in combination with other metallic or non-metallic stabilizers.

While the invention has been described with reference to specific embodiments, it is to be understood that it is not to be limited thereto and that various modifications may be made, and equivalents substituted therefor, without departing from the gist of the invention.

I claim:

1. A compound of the formula

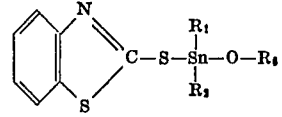

wherein $R_1$ and $R_2$ are hydrocarbons of up to 22 carbon atoms, and $R_6$ is a member of the group consisting of phenyl, alkylphenyl, and OC—$R_3$, wherein $R_3$ is a hydrocarbon carboxylic acyl containing 8–18 carbon atoms.

2. Dibutyltinmono-2-benzothiazyl mercaptide mono ester of a saturated fatty acid containing 8 to 18 carbon atoms.

3. Dibutyltin mono-2-benzothiazyl mercaptide mono alkyl phenolate, said alkyl group having 1 to 12 carbon atoms.

No references cited.